US006728559B2

(12) United States Patent
Masaki

(10) Patent No.: US 6,728,559 B2
(45) Date of Patent: Apr. 27, 2004

(54) RADIO COMMUNICATION DEVICE AND ELECTRONIC APPARATUS HAVING THE SAME

(75) Inventor: Toshiyuki Masaki, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 560 days.

(21) Appl. No.: 09/730,554

(22) Filed: Dec. 7, 2000

(65) Prior Publication Data

US 2001/0053672 A1 Dec. 20, 2001

(30) Foreign Application Priority Data

Dec. 8, 1999 (JP) .......................................... 11-349000

(51) Int. Cl.[7] .................................................. H04B 1/38

(52) U.S. Cl. ................................ 455/575.5; 455/575.7; 334/702; 334/700 MS

(58) Field of Search ........................... 455/575.1, 575.5, 455/575.7, 550.1, 556.2, 557; 343/702, 700 MS

(56) References Cited

U.S. PATENT DOCUMENTS 5,734,350 A 3/1998 Deming et al.
6,285,328 B1 * 9/2001 Masaki et al. .............. 343/702
6,326,927 B1 * 12/2001 Johnson et al. ............. 343/702

FOREIGN PATENT DOCUMENTS

| | | |
|---|---|---|
| EP | 0 929 116 | 7/1999 |
| EP | 0 944 128 | 9/1999 |
| JP | 10-145124 | 5/1998 |
| WO | WO91/04461 | 4/1991 |

OTHER PUBLICATIONS

Toshiyuki Masaki et al., "An Antenna Arrangement of an Information Processor", Serial No. 09/456,986, filed Dec. 7, 1999.

* cited by examiner

*Primary Examiner*—Lee Nguyen
(74) *Attorney, Agent, or Firm*—Finnegan, Henderson, Farabow, Garrett & Dunner, L.L.P.

(57) ABSTRACT

A radio communication device includes an antenna for a predetermined frequency band, a radio communication circuit connected to the antenna, and a ground pattern connected to the antenna, a peripheral length of the ground pattern being 0.7 to 1.4 times as great as one wavelength of the predetermined frequency band. With the structure, it is possible to obtain a broader band characteristic without deteriorating the radiation efficiency of the antenna.

17 Claims, 8 Drawing Sheets

RADIO COMMUNICATION DEVICE AND ELECTRONIC APPARATUS HAVING THE SAME

CROSS-REFERENCE TO RELATED APPLICATIONS

This application is based upon and claims the benefit of priority from the prior Japanese Patent Application No. 11-349000, filed Dec. 8, 1999, the entire contents of which are incorporated herein by reference.

BACKGROUND OF THE INVENTION

The present invention relates to a radio communication device having a radio communication function and an electronic apparatus having the same.

A radio communication system called the "Bluetooth" has recently appeared as one short distance radio communication system for a mobile personal computer and portable terminal device. This radio communication system has an available frequency band of 2400 MHz to 2483.5 MHz and adopts a spread spectrum system using a frequency hopping.

The hopping channel is 79 waves (2402 MHz to 2480 MHz) at an interval of 1 MHz and the transmission rate is 1 Mbps and the communication distance is relatively short on the order of 10 m at a transmission power of 0 dBm and 100 m at a transmission power of +20 dBm.

In the case where a radio communication apparatus of such a short distance radio communication system is mounted on a portable personal computer such as a notebook size personal computer, an antenna such as a rod antenna used in a manner to be outwardly projected provides an obstacle at a time of use and some idea should be given to the antenna so as not to be projected outwardly from inside the personal computer.

In order to achieve this purpose, it may be possible to use a chip antenna.

In the notebook size personal computer, a liquid crystal display panel serving also as a cover is hinged to the upper end portion of a keyboard-attached body such that it can be supported at one end side in a swingably openable/closable way. In use of the personal computer, the cover is swung open and, in order to prevent a radiation of an electromagnetic wave, the personal computer is so constructed that the interior of a housing of the body and interior of a housing of the cover are electromagnetically shielded by an electroconductive paint and shield panel.

The body is occupied by a battery, connectors, floppy disk drive, CD-ROM drive, PC card slot, substrate including a CPU, memories, interface circuit, etc., and keyboard and so on and there is no space available and, in the case where an antenna is adopted on the personal computer from the outset, it follows that it will usually be attached to the cover having a built-in liquid crystal display panel.

When, in this case, the liquid crystal display panel of the cover is opened and closed, then a state around a mounted antenna varies greatly and there occurs a shift of the band characteristic. If, therefore, a chip antenna is to be adopted, it is necessary to use a broader-band one.

Jpn. Pat. Appln. KOKAI Publication No. 10-145124 discloses the chip antenna technique using a broader band. This document provides a chip antenna for allowing the use of a radio device for transmitting and receiving a frequency over a broader band.

A chip antenna is comprised of a very small rectangular body having a cross-section size of a few millimeters×a few millimeters and a length of below about 1 cm. Stated in more detail, the chip antenna comprises a small rectangular substrate made principally of barium oxide, aluminum oxide and silica and a spirally wound conductor provided in the longitudinal direction of the rectangular substrate in which case a resistor is connected at one end to the conductor on the surface of the substrate and, further, a feeding terminal is provided for applying a voltage to the conductor through the other end of the resistor.

By this structure, the conductor and resistor are connected in a series array and, by connecting the conductor and resistor in a series array in the chip antenna, it is possible to lower a substantially Q (quality factor) of the chip antenna and, by doing so, to obtain a broader band width.

This conventional technique, however, involves a problem because the broader band is achieved by providing a resistor in the chip antenna and lowering the Q.

This means that there is a limitation on the broading of the band obtained by connecting the conductor and resistor in a series array in the chip antenna. That is, a loss is increased by increasing the series resistance and must be restricted to an allowable range.

BRIEF SUMMARY OF THE INVENTION

Accordingly, it is an object of the present invention to provide a radio communication device for obtaining a broader band characteristic without deteriorating the radiation efficiency of an antenna and an electronic apparatus equipped with the same.

According to one aspect of the present invention, there is provided a radio communication device comprising: an antenna for a predetermined frequency band; a radio communication circuit connected to the antenna; and a ground pattern connected to the antenna, a peripheral length of the ground pattern being 0.7 to 1.4 times as great as one wavelength of the predetermined frequency band.

According to another aspect of the present invention, there is provided a radio communication device comprising: an antenna for a predetermined frequency band, the predetermined frequency band being 2.4 GHz to 2.5 GHz; a radio communication circuit connected to the antenna; and a ground pattern connected to the antenna, a peripheral length of the ground pattern being 90 mm to 170 mm.

According to still another aspect of the present invention, there is provided an electronic apparatus comprising: means for processing information; means for allowing radio communication of the information processed by the means for processing information; an antenna for a predetermined frequency band which is connected to the means for allowing radio communication; and a ground pattern connected to the antenna, a peripheral length of the ground pattern being 0.7 to 1.4 times as great as one wavelength of the predetermined frequency band.

According to still another aspect of the present invention, there is provided an electronic apparatus comprising: means for processing information; means for allowing radio communication of the information processed by the means for processing information; an antenna for a predetermined frequency band which is connected to the means for allowing radio communication, the predetermined frequency band being 2.4 GHz to 2.5 GHZ; and a ground pattern connected to the antenna, a peripheral length of the ground pattern being 90 mm to 170 mm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1A:
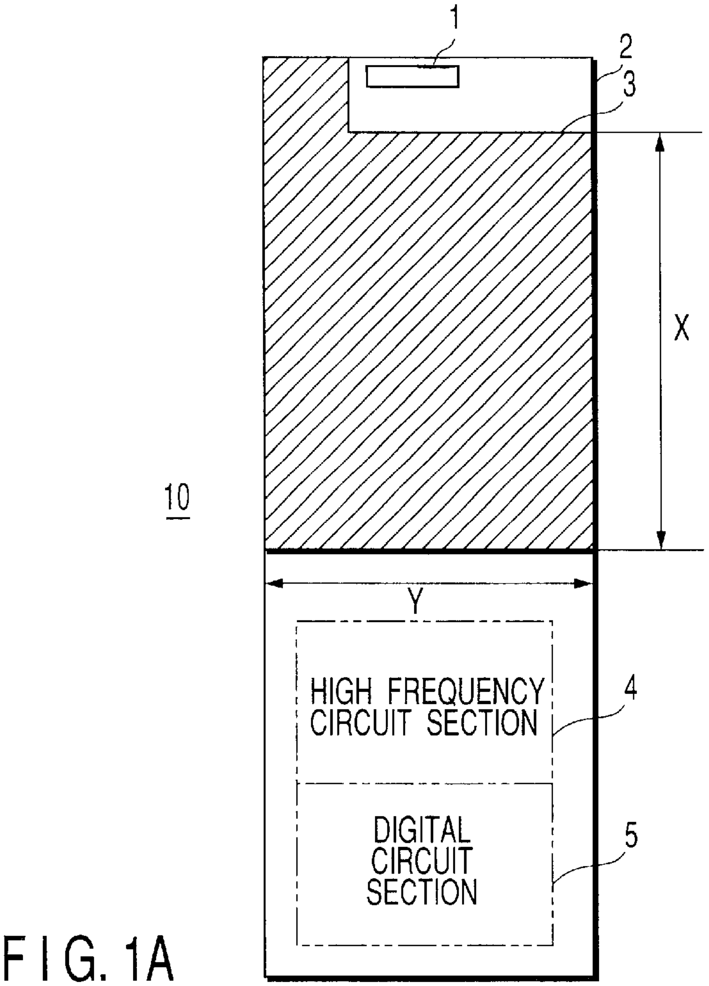
FIGS. 1A to 1C show an arrangement of a radio communication unit according to a first embodiment of the present invention.

The embodiments of the present invention will be described below with reference to the drawing.

<First Embodiment>

FIG. 1A shows an arrangement of a radio communication unit 10 according to a first embodiment of the present invention. The radio communication unit 10 includes, on a printed circuit board 2, a chip antenna 1 and RF circuit section 4 of an analog circuit section for processing transmit/receive radio waves, a baseband section, and a digital circuit section 5 serving as a digital processing system.

The chip antenna 1 may be one of a chip dielectric antenna and a chip multilayer antenna. Preferably, either of the chip dielectric antenna and the chip multilayer antenna may be made of ceramic (i.e., a ceramic antenna).

Figure 1B:
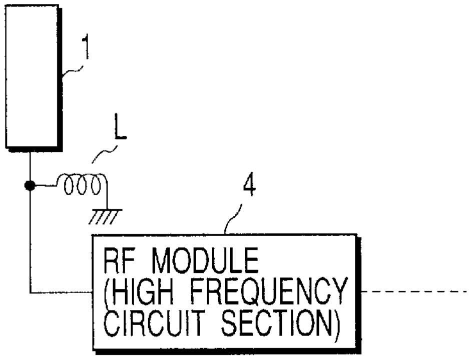
Figure 1C:
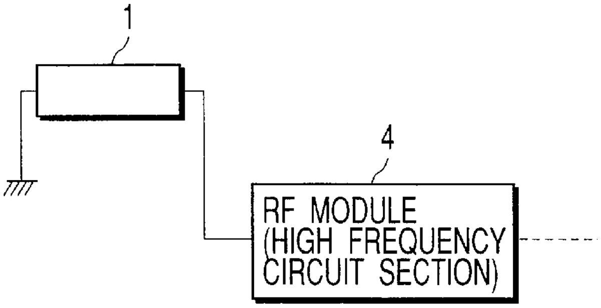

As practical circuit forms near the chip antenna 1 and RF module (such as the RF circuit section) 4 in the analog circuit system section use is made of these forms as shown in FIGS. 1B and 1C. As shown in FIG. 1A, according to the present embodiment, the chip antenna 1 section is provided on one surface side of a rectangular printed circuit board 2 and situated near to one longitudinal end of the printed circuit board 2. The printed circuit board 2 is comprised of a rectangular strip-like board with a GND (ground) pattern 3 of a wide area formed thereon.

In this example, the wide-area GND configuration (configuration of the ground pattern 3) of a printed pattern is an L-shape type with the chip antenna 1 mounted portion and its nearby portion cut away. This ground pattern 3 is used as ground at least analog circuit section of a radio communication unit using the chip antenna 1.

In the present embodiment, with X and Y representing the vertical and horizontal lengths, respectively, of the ground pattern 3, a sum of the X and Y is set to be close to ½ wavelength of an available radio band, that is, close to 1 wavelength of an available radio band when considered from its whole peripheral length. That is, for the case of a square ground pattern 3, the vertical and horizontal lengths are X and Y and its whole peripheral length is 2×(X+Y) and, since X+Y is nearly ½ wavelength, the whole peripheral length becomes nearly 2×(X+Y)=nearly one wavelength.

Thus, the radio communication unit 10 of this embodiment is of such a type that the chip antenna 1 is provided on one surface side of the rectangular printed circuit board 2 and located near to one longitudinal end of the rectangular printed circuit board and, since the ground pattern 3 of the analog circuit section has a length sum of its vertical length X and horizontal length Y set to nearly a ½ wavelength of an available radio band, the ground pattern 3 itself resonates with the available radio frequency of the radio communication unit 10 and it is, therefore, possible to obtain an adequate band characteristic.

Table 1 below shows an example of experiments done. The available frequency band of the "Bluetooth" is in a range of 2400 MHz to 2483.5 MHz and, in the 2400 MHz, its one wavelength is 125 mm. Further one wavelength of 2483.5 MHz is 120.8 mm. Table 1 shows a result of verification as to how the frequency band varies for a ground pattern having a pattern's whole peripheral length corresponding to a wavelength involved in its peripheral frequency range including the frequency above.

TABLE 1

| GND size [mm] | Whole peripheral length [mm] | Frequency band [NHz] | Effect obtained |
|---|---|---|---|
| Y = 45, X = 20 | 130 | 358 | good |
| Y = 35, X = 20 | 110 | 201 | good |
| Y = 25, X = 20 | 90 | 147 | mildly good |
| Y = 25, X = 30 | 110 | 287 | good |
| Y = 25, X = 40 | 130 | 374 | good |
| Y = 25, X = 50 | 150 | 190 | good |
| Y = 25, X = 60 | 170 | 127 | mildly good |

As evident from Table 1, when the size of the GND pattern 3 is Y=45 mm and X=20 mm, that is, the whole peripheral length is 130 mm, the frequency band becomes 358 MHz and, in comparison with the conventional one (100 MHz), the effect obviously proves good. Further, when Y=35 mm and X=20 mm, that is, the whole peripheral length is 110 mm, the frequency band becomes 201 MHz and the effect also proves obviously good.

Further, when Y=25 mm and X=20 mm, that is, the whole peripheral length is 90 mm, the frequency band becomes 147 MHz and, in comparison with the conventional one (100 MHz), the effect is good but to a mild extent.

Further, when Y=25 mm and X=30 mm, that is, the whole peripheral length is 110 mm, the frequency band becomes 287 MHz and, in comparison with the conventional one (100 MHz), the effect proves adequately good.

Further, when Y=25 mm and X=40 mm, that is, the whole peripheral length is 130 mm, the frequency band becomes 374 MHz and the effect also proves adequately good.

Further, Y=25 mm and X=50 mm, that is, the whole peripheral length is 150 mm, the frequency band becomes 190 MHz and, in comparison with the conventional one (100 MHz), the effect proves adequately good.

When Y=25 mm and X=60 mm, that is, the whole peripheral length is 170 mm, the frequency band becomes 127 MHz and, in comparison with the conventional one (100 MHz), the effect proves good but to a mild extent.

From the above-mentioned experiments it is evident that, in the whole peripheral length range form 110 mm to 150 mm nearly corresponding to a range from one wavelength (125 mm) of 2400 MHz to one wavelength (120.8 mm) of 2483.5 MHz, the frequency band becomes 374 MHz to 190 MHz, that is, 3.7 to 1.9 times as great as the conventional one and that, when the whole peripheral length is 90 mm and 170 mm, the frequency band becomes 147 MHz and 127 MHz, respectively, that is, 1.47 to 1.27 times (mildly good) as great as the conventional one and it is evident that, when the whole peripheral length of the ground pattern 3 is set close to one wavelength of an available frequency, an adequate frequency band multiplication effect is obtained.

Thus, when the whole peripheral length of the ground pattern is set close to one wavelength of an available radio band, then a prominent effect is obtained for a broader band use.

The antenna itself is to an extent that it is possible to secure a 100 MHz band at most but, by setting the whole peripheral length of the ground close to one wavelength of a frequency of an available radio frequency band, it is possible to obtain a band of about 350 MHz. From this it may be considered that, when the ground pattern itself of the printed circuit board has such a whole peripheral length, a resonance phenomenon occurs at a frequency band of an available frequency.

When, therefore, such a given ground pattern configuration is selected, the ground pattern itself is resonant to this radio band and it becomes possible to obtain an adequate band characteristic.

From Table 1 it is found that, for the Bluetooth case with an available frequency band of 2.4 GHz to 2.4835 GHz, an adequately effective whole peripheral length is 110 mm to 150 mm. Considered from this in terms of the frequency range it may be said that an adequately good range is from 0.88 wavelength (110 mm/125 mm=0.88 wavelength) to about 1.24 wavelength (150 mm/121 mm=1.239 wavelength) of the band frequency.

The whole peripheral length when it is confirmed, though not being adequate, that the band characteristic is made broader than the conventional one is 90 mm and 170 mm and, since the wavelength range is from 90 mm/125 mm 0.72 wavelength for the former case to 170 mm/121 mm=1.40 wavelength for the latter case, it may be said that a plausibly effective whole periphery length is in a range from about 0.7 wavelength to about 1.4 wavelength of a band frequency.

From these it may be said that, upon experimentally estimating the best range, the whole peripheral length of the ground pattern on the printed circuit board is nearly one length of an available band frequency. Stated in more detail, the whole peripheral length of the ground pattern is in a range from about 0.7 wavelength to about 1.4 wavelength of a band frequency, preferably in a range of about 0.8 wavelength to about 1.25 wavelength, and more preferably, in a range of about 0.85 wavelength to about 1.05 wavelength of a band frequency.

A practical embodiment of a radio communication unit using a printed circuit board with such chip antenna 1 provided thereon will be explained below as a second embodiment.

<Second Embodiment>

Figure 2:
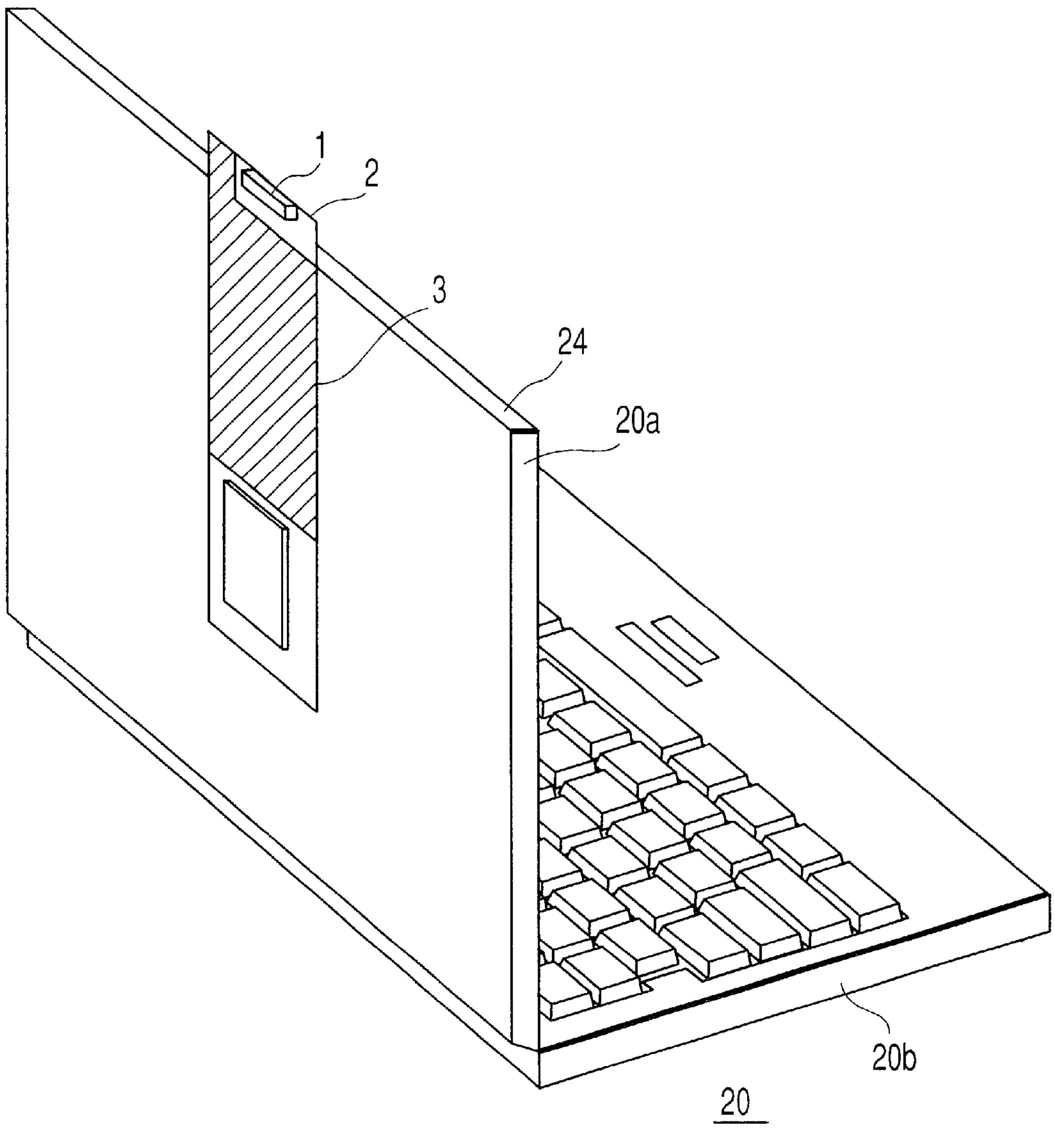
FIG. 2 is a perspective view showing an arrangement of a notebook size personal computer according to a second embodiment of the present invention.

FIG. 2 is a perspective view showing a portable type personal computer, such as a notebook size personal computer 20, having the radio communication unit 10 using a printed circuit board with the chip antenna 1 provided thereon. As shown in FIG. 2, it is mounted inside the back surface side of a cover 20*a* of the notebook size personal computer 20 with a flat panel display, such as a liquid crystal display (LCD), attached thereto, that is, inside a housing comprised of a cover 20*a* and at the back surface side of the liquid crystal display 24. The liquid crystal display 24 has its back surface covered with a metal case serving as both a reinforcement member and magnetic shield and the radio communication unit 10 is attached to the back surface of the shield case of the liquid crystal display 24 with a ground pattern of a printed circuit board located on the back surface of the shield case.

It is to be noted that, in order to secure a better transmit/receive environment of the chip antenna, the radio communication unit 10 is located in the cover 20*a* such that an antenna section is outwardly projected from the shield case of the liquid crystal display 24.

In the case where the interior of the cover 20*a* is wholly magnetically shielded by being coated with a conductive paint, the radio communication unit 10 has its antenna section projected by about 5 mm, or more, from the cover 20*a*.

Figure 3:
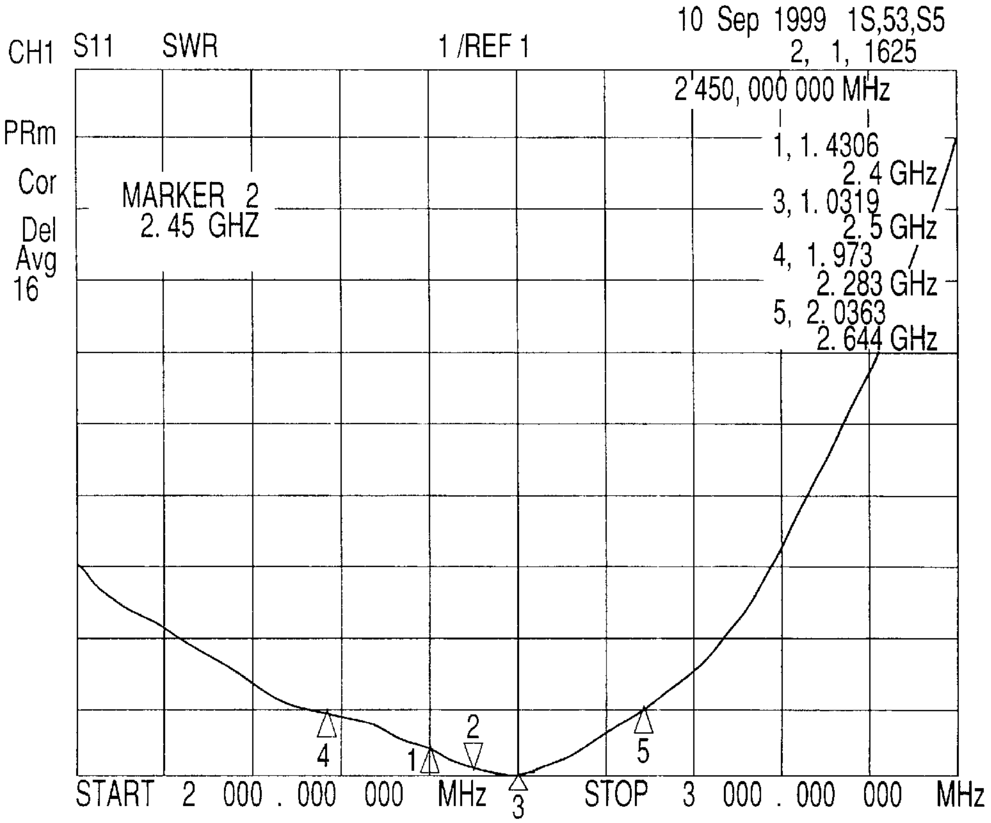
FIG. 3 is an input VSWR (standing wave ratio) characteristic diagram at the inputting section of a chip antenna in the case where the whole peripheral length of a ground pattern on a printed circuit board of a radio communication module is set to 13.5 cm.

FIG. 3 shows an input VSWR (standing wave ratio) characteristic at an input section of the chip antenna 1 in which case the radio communication unit 10 here used 2.4 GHz (one wavelength: 12.5 cm) to 2.5 GHz (one wavelength: 12 cm) and the whole peripheral length of a ground pattern 3 on the printed circuit board 2 of the radio communication unit 10 is set to be 13.5 cm which is a 1.1 wavelength corresponding to a wavelength of 12.25 cm at a midpoint of an available radio band.

As shown on the characteristic diagram, since the radio communication unit 10 is mounted on the notebook size personal computer with its antenna section outwardly projected from the shield case of the liquid crystal display 24, the antenna alone allows the input VSWR≦2 band which was about 100 MHz in the conventional case to be made broader up to about 350 MHz and from this it is found that a stable input VSWR characteristic is obtained even with the liquid crystal display in an ON state or in an OFF state. By adopting such a mounting structure it is possible to obtain an antenna radiation characteristic of a stable performance.

Figure 4:
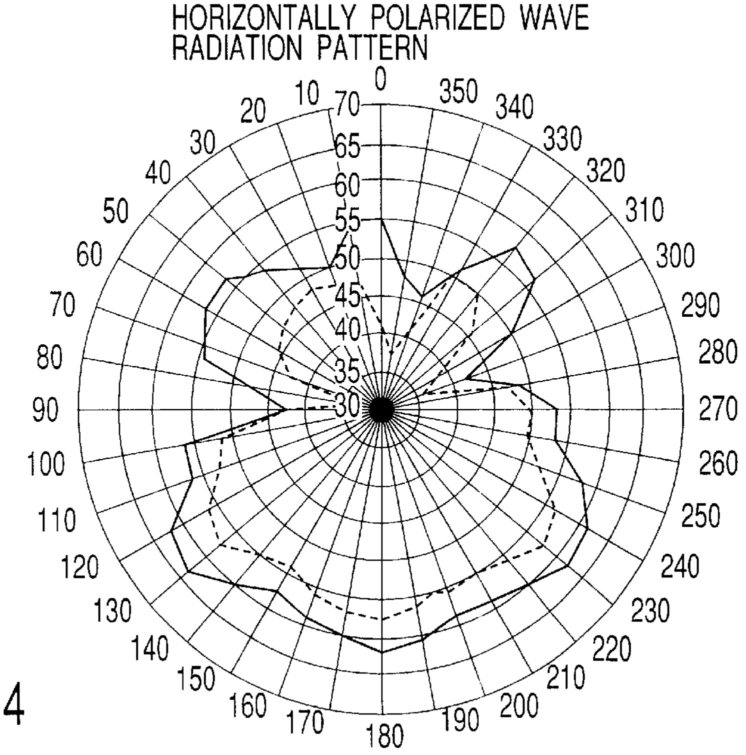
FIG. 4 is a view showing an antenna radiation pattern characteristic in the radio communication unit shown in FIG. 2.

FIG. 4 shows an antenna radiation pattern characteristic on an x-y plane in the structure of FIG. 2.

The characteristic as indicated by a solid line corresponds to the case where the antenna 1 section is projected from the upper end of the shield case of the liquid crystal display, (LCD) 24 and located on the back surface side, that is, the radio communication unit 10 is mounted on the back surface side of the LCD with its antenna 1 section projected 5 mm from the upper end of the cover 20*a* and the characteristic as indicated by a broken line corresponds to the case where the antenna 1 section is attached to the shield case of the liquid crystal display 24 without being projected, that is, the radio communication unit 10 is located inside the cover 20*a* with its antenna 1 section not projected from the upper end of the cover 20*a*. There is an about 6 dB drop for the latter case in comparison with the former case.

This 6 dB difference, being converted to a radio wave reaching distance, becomes about one-half-distance. In the case where an electromagnetic shield structure is adopted by coating the inner side of the cover 20*a* with an electroconductive paint, it is important that, in order to allow a radio wave to be readily received from an outside and readily transmitted toward the outside, at least the antenna 1 section be projected from the cover 20*a*. In the case where a ground pattern section, being broader in its area, it attached to the back surface of the liquid crystal display 24, the housing itself becomes hardly larger because only the chip antenna 1 section of a smaller size is projected. It is to be noted that the extent to which the chip antenna 1 section is outwardly projected from the cover 20*a* is about 10 mm.

That is, in this embodiment, the radio communication unit 10 serving as a radio communication device is of a type as used in the first embodiment and the chip antenna section alone is so arranged as to be projected from the shield case of the liquid crystal display and it is possible to readily radiate a radio wave and obtain a broader directivity performance. The radio communication unit 10 has its ground pattern made broader in area relative to the printed circuit board and, if this section is attached to the back surface of the liquid crystal display 24, only the chip antenna 1 section of a smaller area is projected by a range of about 10 mm, so that the housing itself becomes hardly larger in size.

The foregoing are the cases where the whole peripheral length of the ground pattern is set close to one wavelength of an available frequency band. However, there are sometimes the cases where it is not set close to such one length because the ground pattern is greater in area and complex in shape. This is handled by the following third embodiment.

<Third Embodiment>

In this third embodiment, in order to set a whole peripheral length of a ground pattern of an analog circuit section around a chip antenna 1 close to about one wavelength of an available radio band, a ground pattern 3*a* of the analog circuit section around the chip antenna 1 and a ground pattern 3*b* of a circuit section including a high frequency circuit section and baseband section are formed separately. And both the ground patterns 3*a* and 3*b* are separated in a high frequency way and connected in a DC current way. To this end, these ground patterns are connected by a chip inductor 55.

By doing so, the separately formed ground patterns 3*a* and 3*b* are connected in a DC current way and divided in a high frequency way due to a high impedance involved, so that, by being seen in the high frequency way, the ground pattern 3*a* on the analog circuit section at the peripheral side of the chip antenna 1 enables its whole peripheral length to be set to be about one wavelength of a frequency of an available radio band.

This embodiment provides a practical example for handling the case where ground pattern, being longer in area and complex in shape, does not have its whole peripheral length set close to one wavelength of a frequency of an available radio band.

Figure 5:
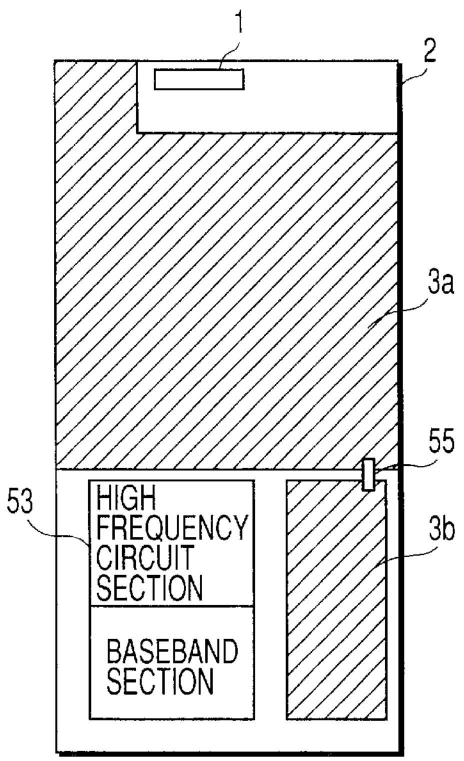
FIG. 5 is a view showing an arrangement of a radio communication unit in the case where a ground pattern of an analog circuit section at the peripheral side of a chip antenna in a third embodiment of the present invention and a ground pattern of a digital circuit section in a digital circuit processing system are separated in a high frequency way.

In such a situation, as set out above, the ground pattern 3 is comprised of a plurality of divided sections mutually separated in a high frequency way. For example, FIG. 5 shows a two-divided example and, as shown in FIG. 5, the ground pattern on the printed circuit board 2 comprises separated areas 3*a* and 3*b*. The area 3*a* is comprised of a ground pattern of the analog circuit section (radio analog system in a radio communication unit 10) at the peripheral side of the antenna 1 and the area 3*b* is comprised of a ground pattern of a digital circuit section 53 of a digital processing system in the radio communication unit 10. The two ground patterns 3*a* and 3*b* are electrically connected by the chip inductor 55, so that these ground patterns provide one body as seen in a DC current way but they are separated in a high frequency way.

That is, the radio communication unit 10 constructing the third embodiment shown in FIG. 5 (plan view) has the chip antenna 1, RF circuit section and baseband section mounted on the printed circuit board 2 and the ground pattern is comprised of two separated areas, not a single area. By connecting the separated ground patterns 3*a* and 3*b* by the chip inductor 55, these ground patterns are connected in a DC current way and divided in the high frequency way due to a high impedance involved.

Even in the structure of FIG. 5, the radio communication unit 10 is so configured that, as in the structure shown in FIG. 1A, the antenna 1 is attached to one surface side of a rectangular printed circuit board 2 and situated near to one longitudinal end portion of the rectangular printed circuit board 2. The printed circuit board 2 is comprised of a rectangular strip-like configuration on which wider GND (ground) patterns 3*a* and 3*b* are formed.

The printed circuit pattern's wider area GND configuration is not comprised of a single area but comprised of two divided areas 3*a* and 3*b*, the area 3*a* constituting a first ground pattern 3*a* situated at an area having a mounted antenna 1 and the area 3*b* constituting a second ground pattern 3*b* situated at another area.

The first ground pattern 3*a* is of an L-shaped configuration with a chip antenna 1 mounting area and its nearby area eliminated. The second ground pattern 3*b* is square in shape and separated from the first ground pattern 3*a* and connected by the chip inductor 55 to the first ground pattern 3*a* to provide one unit in a DC current way.

In this embodiment, only the first ground pattern 3*a* has its whole outer extending distance set to a length close to one wavelength of one available radio band. Stated in more detail, the whole peripheral length of an outer configuration of the first ground pattern 3*a* is set to a length (about 0.8 to 1.25 of the length of available radio band) range near to one length of an available radio band.

If the outer configuration is square, then it follows that the sum of the vertical length X and horizontal length Y is set to a length close to one-half length of an available radio band.

The radio communication unit 10 of this embodiment as shown in FIG. 5 is so configured that the chip antenna 1 is provided on one surface side of the rectangular printed circuit board 2 and situated near to one longitudinal end portion of the printed circuit board 2 and the ground pattern 3 is divided into two (or three or more if necessary) areas. In this case, one ground pattern 3*a* has a sum of its vertical length X and horizontal length Y set to a length close to one-half wavelength of an available radio band (a length of about 0.8 to 1.25 corresponding to a length close to one-half wavelength of an available radio band) and, by doing so, in a high frequency way, the ground pattern 3*a* itself is resonant to the available radio band of the radio communication unit 10. It is, therefore, possible to obtain an adequate band characteristic.

In the third embodiment, the ground pattern 3*a* of the analog circuit section at the peripheral side of the chip antenna 1 and ground pattern 3*b* in the circuit section 53 including the high frequency circuit section 53 and baseband section are separated in the high frequency way and connected together by the chip inductor 55. By doing so, these ground patterns are connected in the DC current way and divided in the high frequency way due to a high impedance involved and, upon being seen in the high frequency way, the ground pattern 3*a* of the analog circuit section at the peripheral side of the chip antenna 1 has its whole peripheral length set to be about one wavelength of the frequency of the available frequency band.

Even if the ground pattern as a whole has its whole peripheral length far exceed a length corresponding to about one wavelength of the frequency of the available radio band, the ground pattern 3*a* of the analog circuit section has its whole peripheral length selected to a value close to one wavelength of a frequency of the available radio band and it is, therefore, possible to obtain an about 350 MHz band performance in the same way as set out above.

<Forth Embodiment>

A fourth embodiment of the present invention will be explained below with references to FIGS. 6 and 7. Here, an explanation will be made about the case where the radio communication unit 10 of the first and third embodiments cannot secure a space enough great to be stored in the cover with a liquid crystal display of a notebook size personal computer stored therein.

Figure 6:
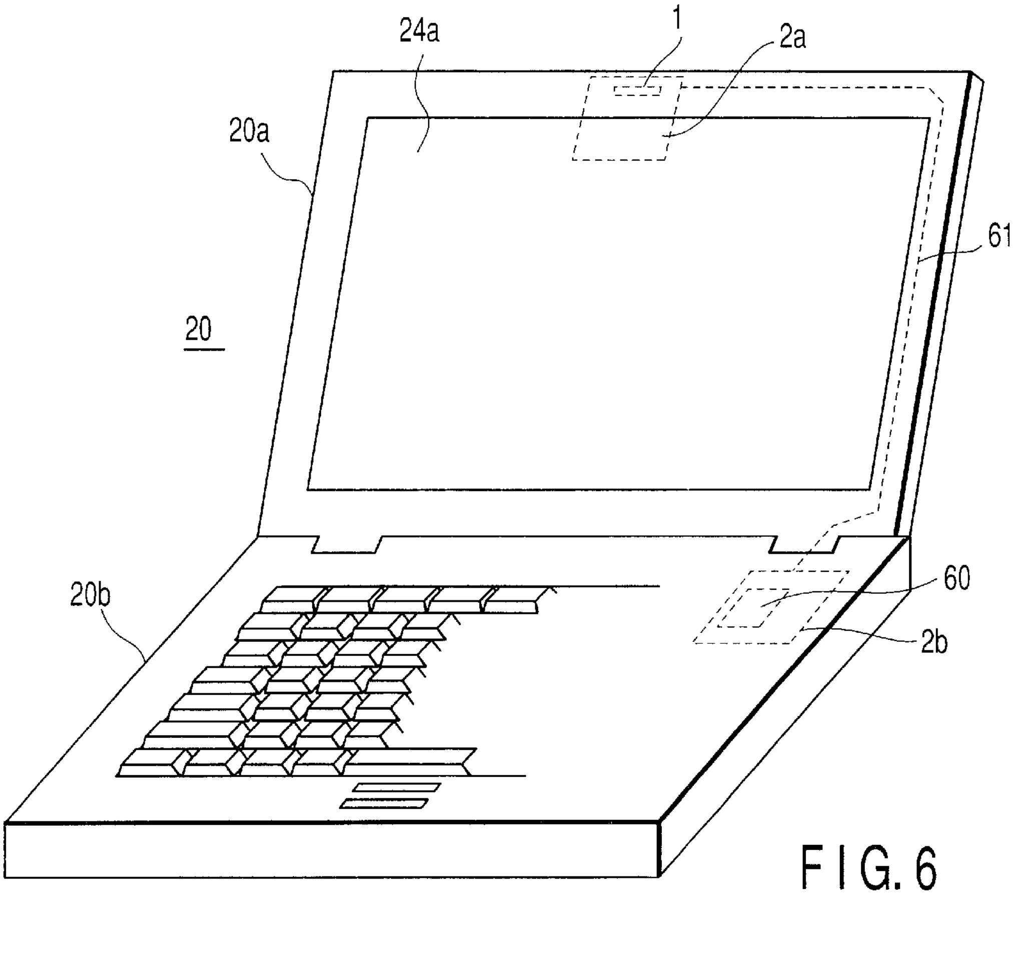
FIG. 6 is a perspective view showing a structure of a notebook size personal computer according to a fourth embodiment of the present invention.

FIG. 6 shows a structure of the fourth embodiment of the present invention and it shows a structure and connection relation of a chip antenna 1 and radio module 60 in the notebook size personal computer. The structure of FIG. 6 is of such a type that a radio communication unit is divided into two sections, that is, an antenna substrate section 2*a* with a chip antenna 1 mounted thereon and a radio module substrate section 2*b* with a radio module 60 mounted thereon with these substrates 2*a* and 2*b* connected by a coaxial cable 61.

Even in this embodiment, a ground pattern configuration of the antenna substrate 2*a* has its whole peripheral length set to a value close to one wavelength of a frequency of an available radio band as set out above.

And the antenna substrate section 2*a* with the chip antenna 1 mounted thereon is attached to a cover 20*a* of the notebook size personal computer 10 and the radio module substrate section 2*b* with the radio module 60 mounted thereon is attached to a body 20 section of the notebook size personal computer 20.

Figure 7:
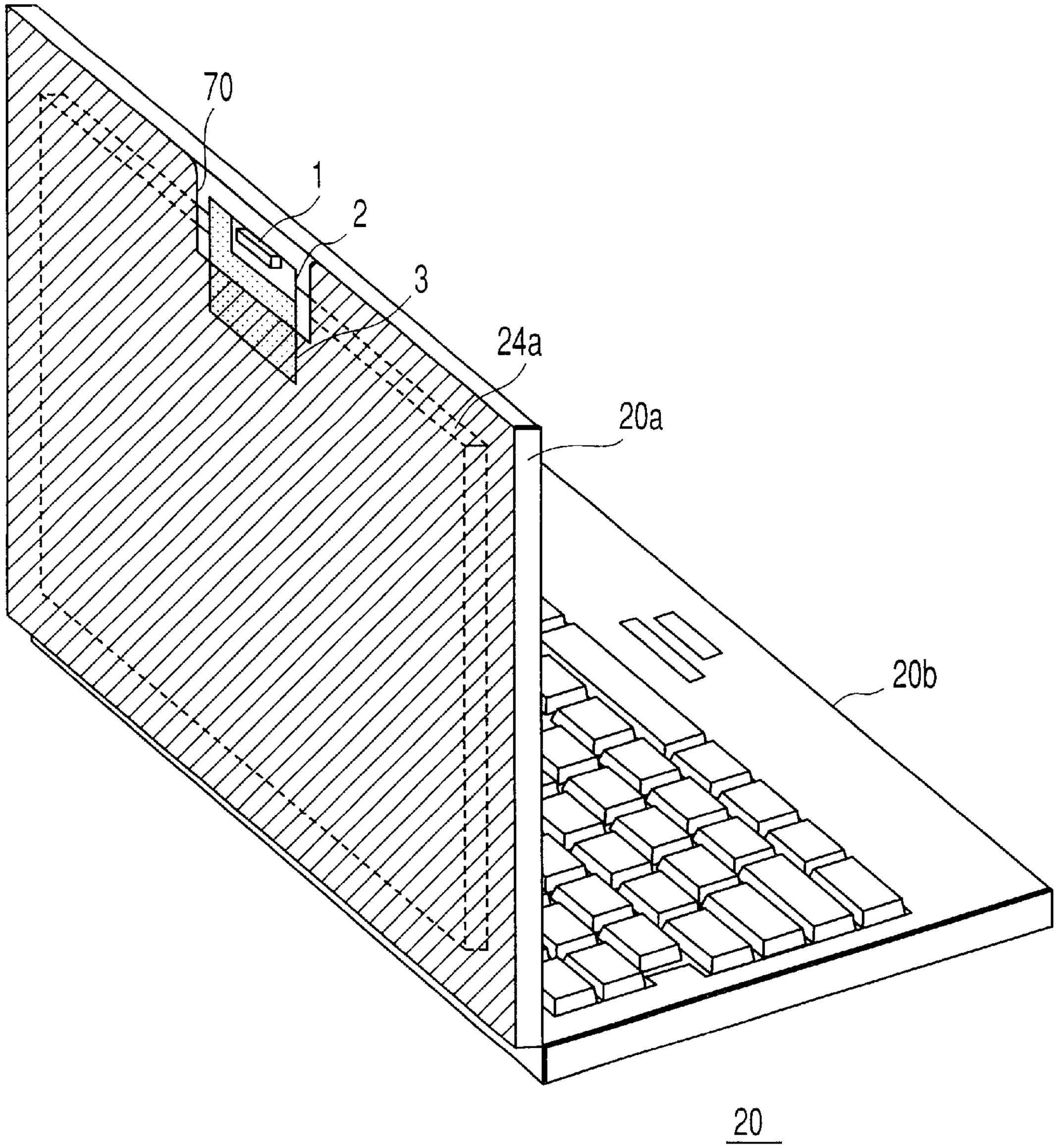
FIG. 7 is a perspective view showing a structure of a notebook size personal computer, as seen from a back surface side, according to the fourth embodiment of the present invention.

In order to electromagnetically shield the liquid crystal display 24, the inner surface of a housing at the cover 20*a* section of the notebook size personal computer 20 is coated with a magnetic paint to provide a magnetic shield area 70 and a chip antenna 1 arranging area is not coated at its peripheral area with the magnetic paint to provide a non-magnetic-shield area as shown in FIG. 7. Stated in more detail, the chip antenna 1 arranging area has its peripheral side not coated to an about 1 cm width extent with the magnetic paint to provide a non-magnetic-shield area.

Since, in this structure, there is no magnetic shield around the chip antenna, it is possible to transmit and receive a radio wave at the inner side of the housing of the cover and, in addition, it is also possible to obtain a broader band effect by providing a ground pattern of an analog circuit section at the periphery side of the chip antenna in a way to have its whole peripheral length set to be about one wavelength of an available radio band. Further, it is possible to achieve the thinning of the housing as a whole of the notebook size personal computer by arranging the antenna substrate 2*a* alone at the back surface of a liquid crystal display 24 and incorporating the radio module substrate 60 into the body 20*b* of the notebook size personal computer 20.

<Fifth Embodiment>

Now an improved example of the second embodiment will be explained below. The fifth embodiment is comprised of a practical example in which the radio communication units of the first and third embodiments are stored in a cover with a liquid crystal display of a notebook size personal computer incorporated therein and are completely stored there without being projected.

Figure 8:
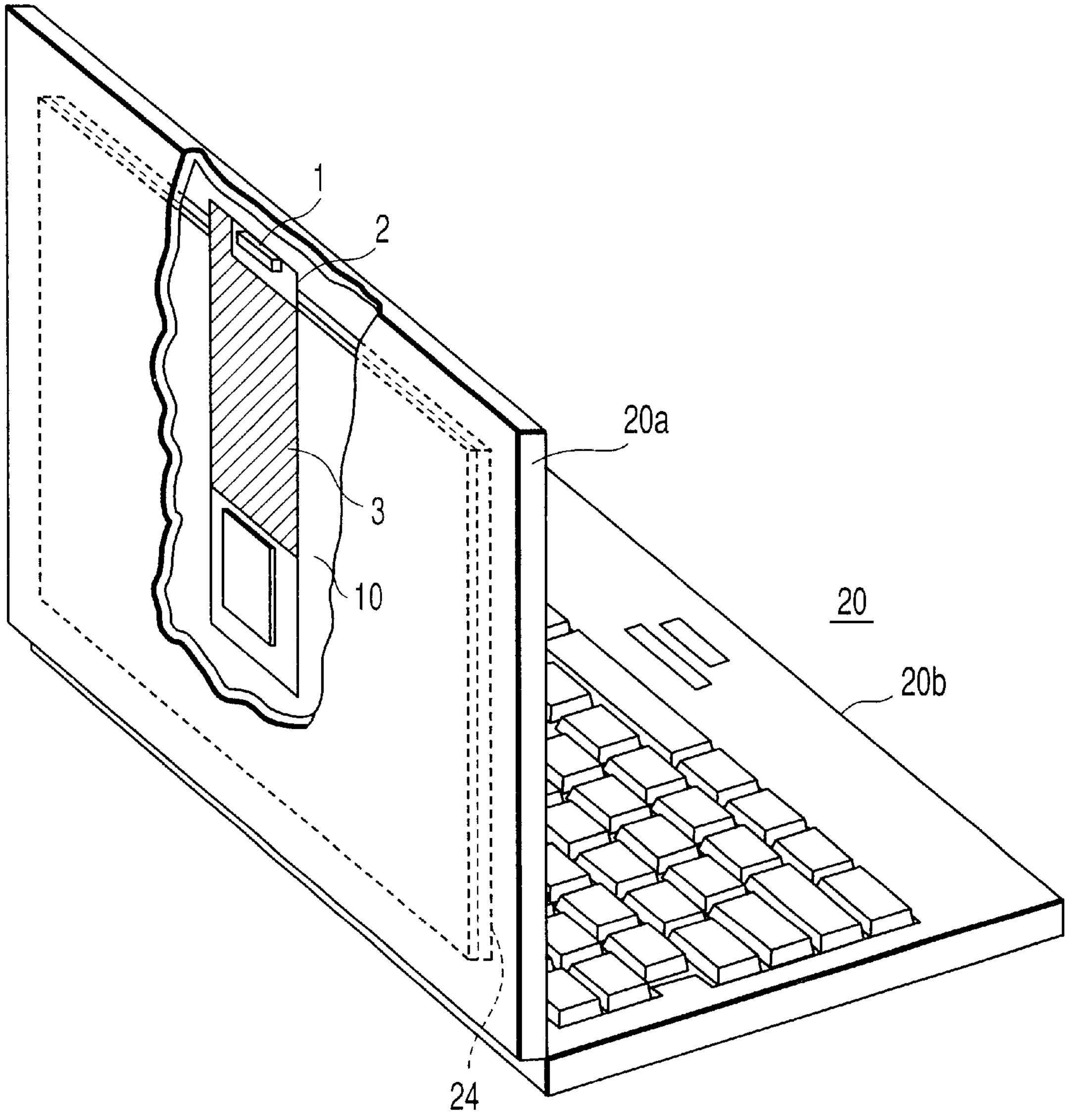
FIG. 8 is a perspective view showing a structure of a notebook size personal computer according to a fifth embodiment of the present invention.
Figure 9:
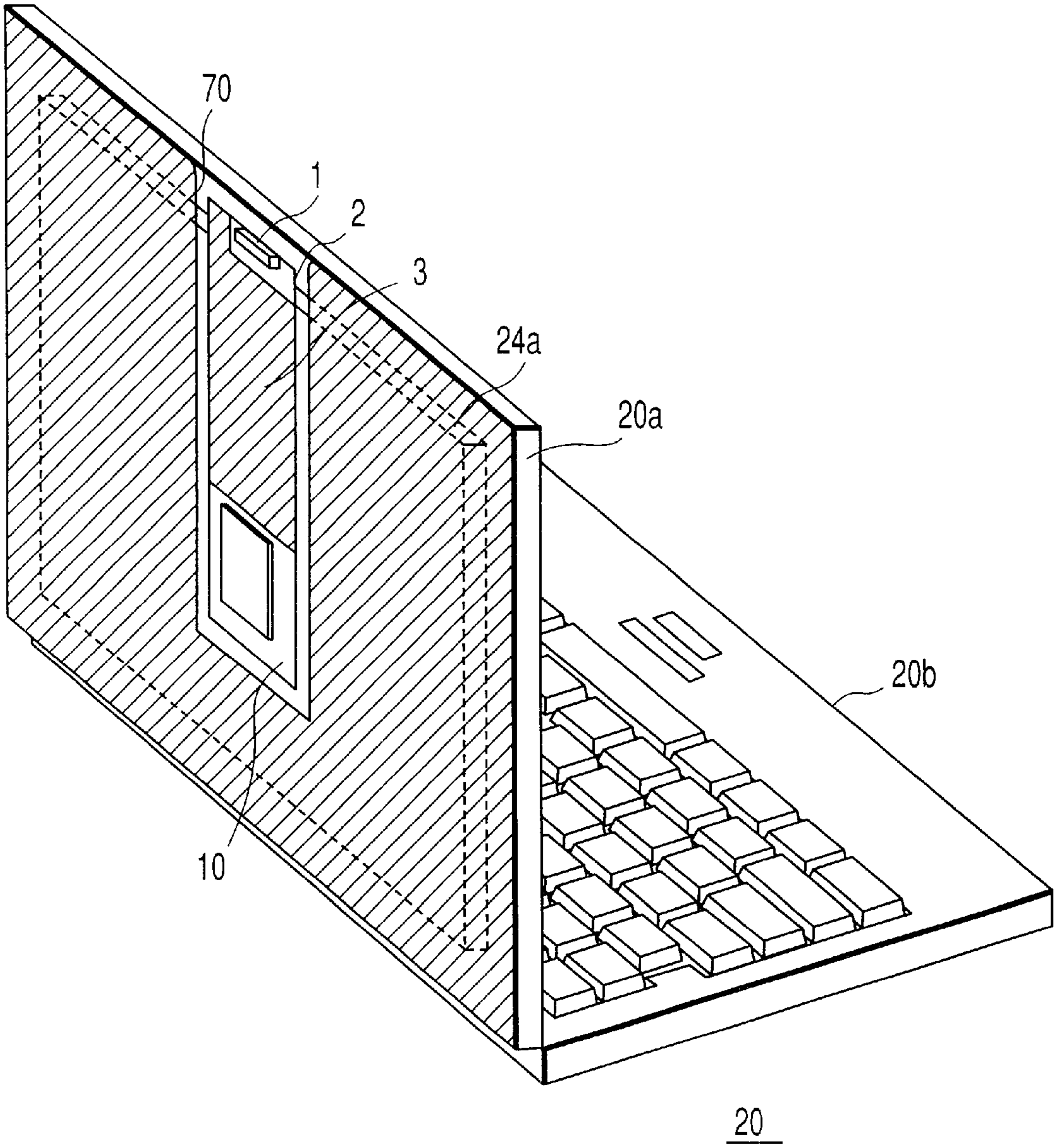
FIG. 9 is a perspective view showing a structure of the notebook size personal computer according to the fifth embodiment of the present invention.

FIGS. 8 and 9 show a perspective view showing the structure of the fifth embodiment applied to the notebook size personal computer. The radio communication unit as explained in connection with FIG. 1A and FIG. 5 is arranged in the housing of a cover 2*a* of the notebook size personal computer.

In the second embodiment as explained in connection with FIG. 2, the inner side of a housing of the cover 20*a* is so constructed as to be electromagnetically shielded by being coated with the electroconductive paint for instance. If, in this case, the radio communication unit 10 is completely stored within the housing of the cover 20*a*, then it is not possible to receive an incoming radio wave from an outside and transmit a radio wave toward an outside. This is the reason why the chip antenna 1 section is projected from outside the housing of the cover 20*a*.

The chip antenna section, though being smaller in size, appears unsightly in view of its being projected outwardly from the notebook size personal computer which has recently been made smaller and smaller.

An explanation will now be made about an embodiment in which even a chip antenna 1 section is completely stored in the housing of the cover 20*a* without being outwardly projected from the housing. Although, in this embodiment, even the chip antenna 1 section is completely stored in the housing of the cover 20*a*, the interior of the housing of a cover 2*a* is coated with an electroconductive paint except at a radio communication unit 10 mounting area to allow a radio wave to be transmitted to and received from an outside. By doing so, an electromagnetic shield area 70 is created. That is, according to this embodiment, no electroconductive paint is coated on the interior of the housing of the cover 20*a* at the radio communication unit 10 mounting area.

A liquid crystal display 24 is stored in the housing of the cover 20*a* and, in this case, the back surface side of the liquid crystal display 24 itself is covered with a metal plate so as to maintain its structural strength and suppress the radiation of an electromagnetic wave. This structure exerts no greater practical adverse influence on the leakage of an electromagnetic wave even if there is an area not coated with any electroconductive paint.

In the present embodiment, the chip antenna 1 section is attached to the back surface side of the liquid crystal display 24 such that it is projected from the upper edge of the liquid crystal display 24 but it is situated at the inner side of the housing of the cover 20*a* as shown in FIGS. 8 and 9. The housing of the cover 20*a* serves as a frame for holding the liquid crystal display 24 in place and, therefore, the liquid crystal display does not occupy a whole frame area of the cover 20*a*.

In the housing of the cover 20*a*, there is a proper space between the housing and the upper edge of the liquid crystal display 24. The radio communication unit 10 is attached to the back surface side of the liquid crystal display 24 or to the inner wall surface of the housing of the cover 20*a* such that, through the utilization of this space, the chip antenna 1 section is projected from the upper edge of the liquid crystal display 24. At the attachment of the radio communication unit 10 use may be made of any proper retaining means such as a double-sided bonding tape.

At this time, the chip antenna 1 section is projected about 10 mm from the upper edge of the liquid crystal display 24 and, by doing so, is hardly affected by an electromagnetic effect from the back surface side metal plate of the liquid crystal display 24. Ideally, the radio communication unit 10 is located at the upper middle area of the cover 20*a* as shown in FIGS. 7 and 8.

By doing so, the radio communication unit 10, being viewed from outside the cover 20*a*, is situated at a non-electromagnetic shield area, thus enabling a radio wave to be freely transmitted and received to and from an outside at the antenna 1.

It is to be noted that it may be possible to coat an electroconductive paint only on the chip antenna 1 section in place of on the whole area of the radio communication unit 10. In this case, an area not coated with the electroconductive paint is formed about 10 mm around at least the chip antenna. Ideally, the radio communication unit 10 is provided at the upper middle area of the cover 20*a* as shown in FIGS. 8 and 9, but it cannot be so done due to some restriction involved.

Figure 10:
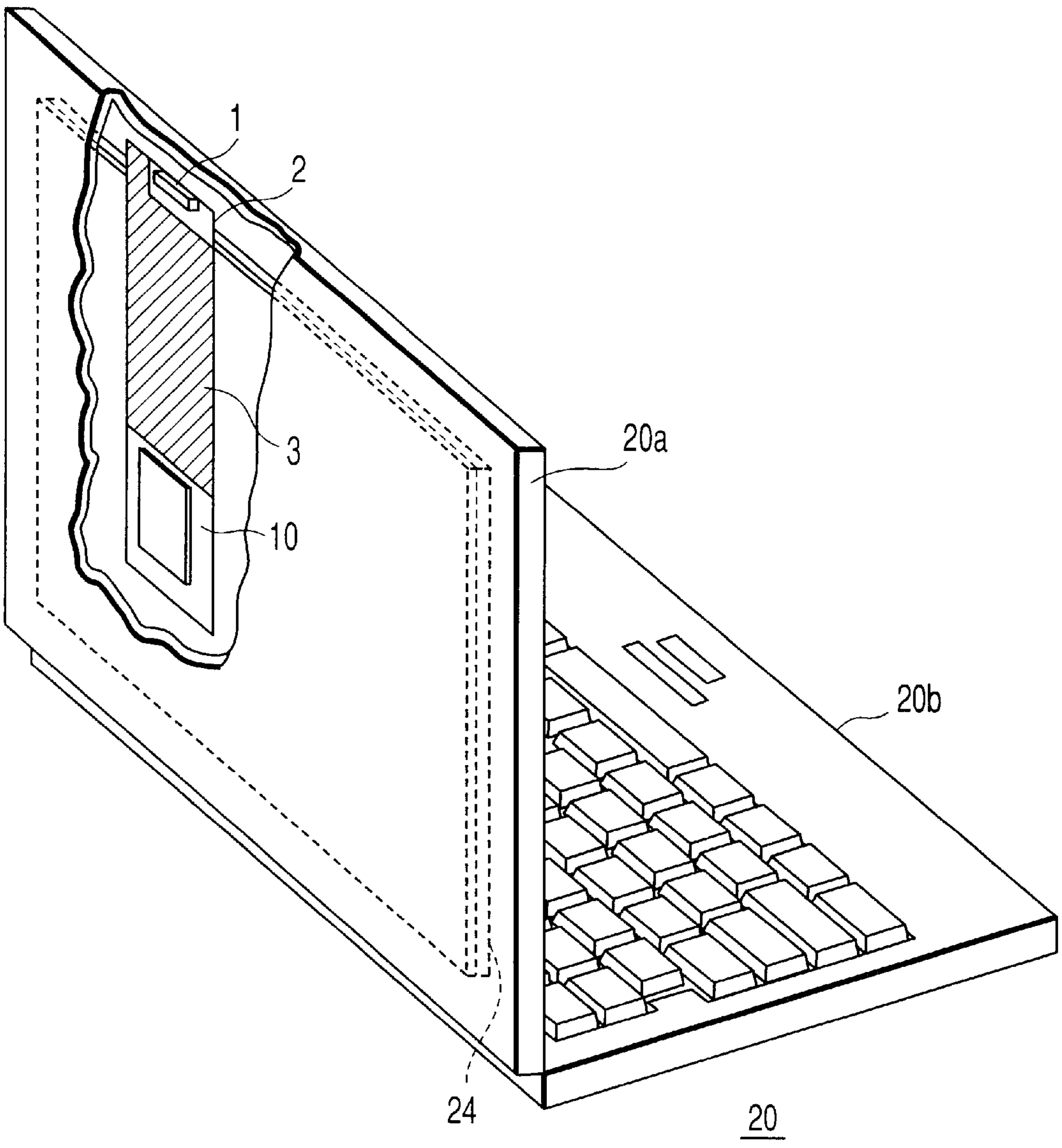
FIG. 10 is a perspective view showing a structure of a notebook size personal computer as a modification of the fifth embodiment of the present invention.

In this case, the radio communication unit 10 may be provided a little to the right side as shown in FIG. 10 or a little to the left side from the middle of the cover 20*a*. Even in this case, it is needless to say that the electroconductive paint is not coated on an area about 10 mm around the radio communication unit 10 section or chip antenna section and the chip antenna 1 section is so provided as to be projected about 10 mm from the upper edge of the liquid crystal display 24 and, by doing so, is hardly affected by an electromagnetic effect from the back metal plate of the liquid crystal display 24.

Although the various kinds of embodiments have been explained, it may be said that, in order to make the ground pattern on the printed circuit board with a chip antenna mounted thereon resonant to a specific frequency band, the whole peripheral length of the ground pattern is set close to one wavelength of a frequency of the specific frequency band whereby it is possible to obtain an antenna input section having a broader band characteristic.

The present invention is not restricted to the above-mentioned embodiment and various changes or modifications of the present invention can be made. Although, in the above-mentioned embodiment, the present invention has been explained mainly as being applied to the notebook size personal computer, it can be applied to various kinds of portable terminal units, mobile devices and installed devices.

As set out in more detail above, according to the present invention, the ground on the printed circuit board with the chip antenna mounted thereon is made resonant to a specific frequency band and, by doing so, the broader band characteristic is obtained at the antenna input section. In addition, the chip antenna is provided on the printed circuit board with only the chip antenna section projected from the shield case of the liquid crystal display and it is, therefore, possible to readily radiate a radio wave and to obtain a broader directive performance.

According to the present invention, it is possible to provide a radio communication device and an electronic apparatus equipped with the radio communication device that can obtain a broader band characteristic of an antenna without deteriorating the radiation efficiency of the antenna.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication device comprising:

an antenna for a predetermined frequency band;

a radio communication circuit connected to the antenna; and a ground pattern connected to the antenna, a peripheral length of the ground pattern being 0.7 to 1.4 times as great as one wavelength of the predetermined frequency band, wherein the ground pattern comprises a first ground pattern and a second ground pattern separately formed, and the radio communication device further comprises an inductance element connected between the first and second ground patterns.

2. The radio communication device according to claim 1, wherein the peripheral length of the ground pattern is 0.8 to 1.25 times as great as one length of the predetermined frequency band.

3. The radio communication device according to claim 1, wherein the predetermined frequency band is 2.4 GHz to 2.5 GHz and the peripheral length of the ground pattern is 90 mm to 170 mm.

4. The radio communication device according to claim 3, wherein the peripheral length of the ground pattern is 110 mm to 150 mm.

5. The radio communication device according to claim 1, further comprising a printed circuit board with the antenna and ground pattern attached thereto.

6. The radio communication device according to claim 1, wherein the antenna is made of ceramic.

7. The radio communication device according to claim 6, wherein the antenna comprises one of a chip dielectric antenna and a chip multilayer antenna.

8. An electronic apparatus comprising:

means for processing information;

means for allowing radio communication of the information processed by the means for processing information;

an antenna for a predetermined frequency band which is connected to the means for allowing radio communication; and a ground pattern connected to the antenna, a peripheral length of the ground pattern being 0.7 to 1.4 times as great as one wavelength of the predetermined frequency band; and a display device having an information display section and an electromagnetic shield section, and wherein the antenna is provided on the display device and projected a predetermined length from the electromagnetic shield section.

9. The electronic apparatus according to claim 8, wherein an amount by which the antenna is projected from the electromagnetic shield section is at least 5 mm.

10. The electronic apparatus according to claim 8, further comprising a housing that contains the display device and provides an electromagnetic shield area except at an antenna providing section.

11. The electronic apparatus according to claim 8, wherein the peripheral length of the ground pattern is 0.8 to 1.25 times as great as one length of the predetermined frequency band.

12. The electronic apparatus according to claim 8, wherein the predetermined frequency band is 2.4 GHz to 2.5 GHz and the peripheral length of the ground pattern is 90 mm to 170 mm.

13. The electronic apparatus according to claim 12, wherein the peripheral length of the ground pattern is 110 mm to 150 mm.

14. The electronic apparatus according to claim 8, further comprising a printed circuit board with the antenna and ground pattern attached thereto.

15. The electronic apparatus according to claim 8, wherein the antenna is made of ceramic.

16. The electronic apparatus according to claim 15, wherein the antenna comprises one of a chip dielectric antenna and a chip multilayer antenna.

17. An electronic apparatus comprising:

means for processing information;

means for allowing radio communication of the information processed by the means for processing information;

an antenna for a predetermined frequency band which is connected to the means for allowing radio communication; and a ground pattern connected to the antenna, a peripheral length of the ground pattern being 0.7 to 1.4 times as great as one wavelength of the predetermined frequency band, wherein the ground pattern comprises a first ground pattern and a second ground pattern separately formed, and the electronic apparatus further comprises an inductance element connected between the first and second ground patterns.

* * * * *

UNITED STATES PATENT AND TRADEMARK OFFICE

CERTIFICATE OF CORRECTION

PATENT NO. : 6,728,559 B2
DATED : April 27, 2004
INVENTOR(S) : Masaki

It is certified that error appears in the above-identified patent and that said Letters Patent is hereby corrected as shown below:

<u>Column 12,</u>
Lines 54-55, change "communication; and" to -- communication; --.

Signed and Sealed this

Sixth Day of July, 2004

JON W. DUDAS
*Acting Director of the United States Patent and Trademark Office*